(12) United States Patent
Ryu et al.

(10) Patent No.: US 10,377,236 B2
(45) Date of Patent: Aug. 13, 2019

(54) ASSISTANCE APPARATUS FOR DRIVING OF A VEHICLE, METHOD THEREOF, AND VEHICLE HAVING THE SAME

(71) Applicant: LG ELECTRONICS INC., Seoul (KR)

(72) Inventors: Seungwon Ryu, Seoul (KR); Junsic Park, Seoul (KR); Yoonna Soh, Seoul (KR); Jieun Song, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/125,604

(22) PCT Filed: Aug. 13, 2015

(86) PCT No.: PCT/KR2015/008534
§ 371 (c)(1),
(2) Date: Sep. 13, 2016

(87) PCT Pub. No.: WO2017/003013
PCT Pub. Date: Jan. 5, 2017

(65) Prior Publication Data
US 2018/0105040 A1    Apr. 19, 2018

(30) Foreign Application Priority Data

Jul. 1, 2015 (KR) .......................... 10-2015-0094076

(51) Int. Cl.
*B60K 35/00*    (2006.01)
*B60W 50/14*    (2012.01)
(Continued)

(52) U.S. Cl.
CPC ............. *B60K 35/00* (2013.01); *B60W 40/04* (2013.01); *B60W 40/06* (2013.01); *B60W 50/14* (2013.01);
(Continued)

(58) Field of Classification Search
CPC ...... B62D 6/00; B62D 15/02; B62D 15/0255; B60W 30/18; B60W 30/18163;
(Continued)

(56) References Cited

U.S. PATENT DOCUMENTS

2005/0269145 A1* 12/2005 Schmidt ............... B62D 15/028
                                                    180/204
2009/0306880 A1* 12/2009 Gomi ..................... G09B 9/052
                                                    701/117
(Continued)

FOREIGN PATENT DOCUMENTS

JP    2005-127995    5/2005
JP    2005-127996    5/2005
(Continued)

*Primary Examiner* — Behrang Badii
(74) *Attorney, Agent, or Firm* — Fish & Richardson P.C.

(57) ABSTRACT

The present invention relates to an assistance apparatus for driving of a vehicle including a display unit displaying the virtual preceding vehicle corresponding to one virtual preceding mode, which is selected by a user, of a plurality of virtual preceding modes, an interface unit receiving route information including destination information that is set by a driver and sensing information detected by a sensing unit, and a processor controlling the virtual preceding vehicle on the basis of the route information and the sensing information.

15 Claims, 18 Drawing Sheets

(51) Int. Cl.

| | | |
|---|---|---|
| *B60W 40/04* | (2006.01) | |
| *B60W 40/06* | (2012.01) | |
| *G05D 1/00* | (2006.01) | |
| *G05D 1/02* | (2006.01) | |
| *G08G 1/16* | (2006.01) | |
| *G08G 1/0962* | (2006.01) | |
| *G08G 1/0967* | (2006.01) | |
| *B60W 30/18* | (2012.01) | |
| *B62D 6/00* | (2006.01) | |
| *G06G 7/70* | (2006.01) | |
| *B62D 15/02* | (2006.01) | |
| *G01C 21/34* | (2006.01) | |
| *G07C 5/08* | (2006.01) | |

(52) U.S. Cl.
CPC ........... *G05D 1/0055* (2013.01); *G05D 1/021* (2013.01); *G08G 1/0962* (2013.01); *G08G 1/096716* (2013.01); *G08G 1/096775* (2013.01); *G08G 1/096791* (2013.01); *G08G 1/163* (2013.01); *G08G 1/164* (2013.01); *G08G 1/165* (2013.01); *G08G 1/167* (2013.01); *B60K 2370/155* (2019.05); *B60K 2370/1529* (2019.05); *B60K 2370/166* (2019.05); *B60K 2370/177* (2019.05); *B60K 2370/186* (2019.05); *B60K 2370/334* (2019.05); *B60K 2370/52* (2019.05); *B60W 30/18* (2013.01); *B60W 2530/14* (2013.01); *B60W 2540/20* (2013.01); *B60W 2550/14* (2013.01); *B60W 2550/308* (2013.01); *B62D 6/00* (2013.01); *B62D 15/02* (2013.01); *G01C 21/34* (2013.01); *G06G 7/70* (2013.01); *G07C 5/0841* (2013.01); *G08G 1/16* (2013.01)

(58) Field of Classification Search
CPC ...... B60W 40/09; B60W 50/08; B60W 40/04; B60W 40/06; B60W 50/14; B60W 2530/14; B60W 2540/20; B60W 2550/14; B60W 2550/308; G09B 9/052; G06G 7/70; G08G 1/16; G08G 1/167; G08G 1/0965; G01C 21/34; H04W 4/21; H04W 48/04; H04W 36/34; H04W 36/0005; H04W 48/02; H04W 4/12; G07C 9/00158; G07C 5/0841; B60R 25/1004; B60R 16/037; G06F 21/31; G06F 21/32; H04L 63/08; H04L 67/12; H04N 21/214; H04N 21/2181; H04N 21/25841; H04N 21/4542; G08B 25/016; G05D 23/1917; G05D 1/0027; G05D 1/0212; G05D 1/0055; G05D 1/021; B60K 35/00; B60K 2350/1072; B60K 2350/1096; B60K 2350/2052; B60K 2350/352

See application file for complete search history.

(56) References Cited

U.S. PATENT DOCUMENTS

| | | | |
|---|---|---|---|
| 2010/0043667 A1* | 2/2010 | Loser | B60L 3/00 |
| | | | 104/284 |
| 2014/0310594 A1* | 10/2014 | Ricci | H04W 4/21 |
| | | | 715/702 |
| 2016/0153802 A1* | 6/2016 | Sato | G01C 21/3626 |
| | | | 701/526 |
| 2017/0320521 A1* | 11/2017 | Fujita | B62D 6/00 |

FOREIGN PATENT DOCUMENTS

| | | |
|---|---|---|
| JP | 2006-284195 | 10/2006 |
| JP | 2008-037167 | 2/2008 |
| JP | 4534922 | 9/2010 |
| KR | 10-1326847 | 11/2013 |
| WO | 2013/005293 | 1/2013 |

* cited by examiner

ASSISTANCE APPARATUS FOR DRIVING OF A VEHICLE, METHOD THEREOF, AND VEHICLE HAVING THE SAME

CROSS REFERENCE TO RELATED APPLICATIONS

This application is a U.S. National Phase Application under 35 U.S.C. § 371 of International Application PCT/KR2015/008534, filed on Aug. 13, 2015, which claims the benefit of Korean Application No. KR 10-2015-0094076, filed on Jul. 1, 2015, the entire contents of which are hereby incorporated by reference in their entireties.

TECHNICAL FIELD

The present invention relates to an assistance apparatus for driving of a vehicle and an operation method thereof, and more particularly, to an apparatus for displaying a virtual preceding vehicle to assist driving of a vehicle by a driver.

BACKGROUND ART

Navigation devices that provide route information up to the set destination to a driver are being widely used. In existing navigation devices, route information is displayed on a screen of a monitor disposed in the vicinity of a consol or displayed by using a separate device. Here, a user may generally recognize the route information through displayed information and voice information.

Head up displays (HUDs) project information such as a speed of a vehicle and a flow rate or image information such as images of a nightvision and a rear view monitor onto a windshield by using a mirror in a state in which the images are enlarged by a lens to allow the driver to easily recognize the information, thereby securing safety.

However, the head up displays are being only used for displaying a virtual preceding vehicle or displaying a speed or driving direction of the vehicle so as to keep a safety distance with respect to a forward vehicle.

DISCLOSURE OF THE INVENTION

Technical Problem

An object of the present invention is to provide an assistance apparatus for driving of a vehicle, which induces a route through a virtual preceding vehicle as wall as guides the vehicle to change a lane and assure a safety distance.

Technical Solution

An assistance apparatus for driving of a vehicle according to an embodiment of the present invention may include a display unit displaying the virtual preceding vehicle corresponding to one virtual preceding mode, which is selected by a user, of a plurality of virtual preceding modes, an interface unit receiving route information including destination information that is set by a driver and sensing information detected by a sensing unit, and a processor controlling the virtual preceding vehicle on the basis of the route information and the sensing information.

A vehicle according to an embodiment of the present invention may include the assistance apparatus for the driving of the vehicle.

A method for controlling an assistance apparatus for driving of a vehicle according to an embodiment of the present invention may include displaying a plurality of virtual preceding modes on a display unit, displaying a virtual preceding vehicle corresponding to at least one virtual preceding mode selected from the plurality of virtual preceding modes, and changing a state of the virtual preceding vehicle on the basis of route information and sensing information, which are received from an interface unit.

Advantageous Effects

According to the embodiments of the present invention, the virtual preceding vehicle providing the various virtual preceding modes may provide the route information to the driver and reflect the real traffic information to assist the driving of the vehicle by the driver.

Also, according to the embodiments, the turn signals of the virtual preceding vehicle may be turned on or off or changed in shape to allow the driver to handle the emergency situation or safely drive the vehicle.

MODE FOR CARRYING OUT THE INVENTION

Hereinafter, embodiments disclosed in this specification is described with reference to the accompanying drawings, and the same or corresponding components are given with the same drawing number regardless of reference number, and their duplicated description will be omitted. Furthermore, terms, such as a "module" ad a "unit", are used for convenience of description, and they do not have different meanings or functions in themselves. Moreover, detailed descriptions related to well-known functions or configurations will be ruled out in order not to unnecessarily obscure subject matters of the present invention. However, this does not limit the present invention within specific embodiments and it should be understood that the present invention covers all the modifications, equivalents, and replacements within the idea and technical scope of the present invention.

It will be understood that although the ordinal numbers such as first and second are used herein to describe various elements, these elements should not be limited by these numbers. The terms are only used to distinguish one component from other components.

It will also be understood that when an element is referred to as being "'connected to" or "engaged with" another element, it can be directly connected to the other element, or intervening elements may also be present. It will also be understood that when an element is referred to as being 'directly connected to' another element, there is no intervening elements.

The terms of a singular form may include plural forms unless referred to the contrary.

The meaning of 'include' or 'comprise' specifies a property, a region, a fixed number, a step, a process, an element and/or a component but does not exclude other properties, regions, fixed numbers, steps, processes, elements and/or components.

In a vehicle described in this specification may be a concept including a car, a motorcycle, and the like. Hereinafter, the car will be described as an example of the vehicle.

The vehicle described in this specification may be a concept including all of an internal combustion engine vehicle including an engine as a power source, a hybrid vehicle including an engine and an electric motor as a power source, and an electric vehicle including an electric motor as a power source.

In the description below, a left side of the vehicle may denote a left side in a driving direction of the vehicle, and a right side of the vehicle may denote a right side in the driving direction of the vehicle.

A left-hand drive (LHD) vehicle will be mainly described unless otherwise noted.

Figure 1:
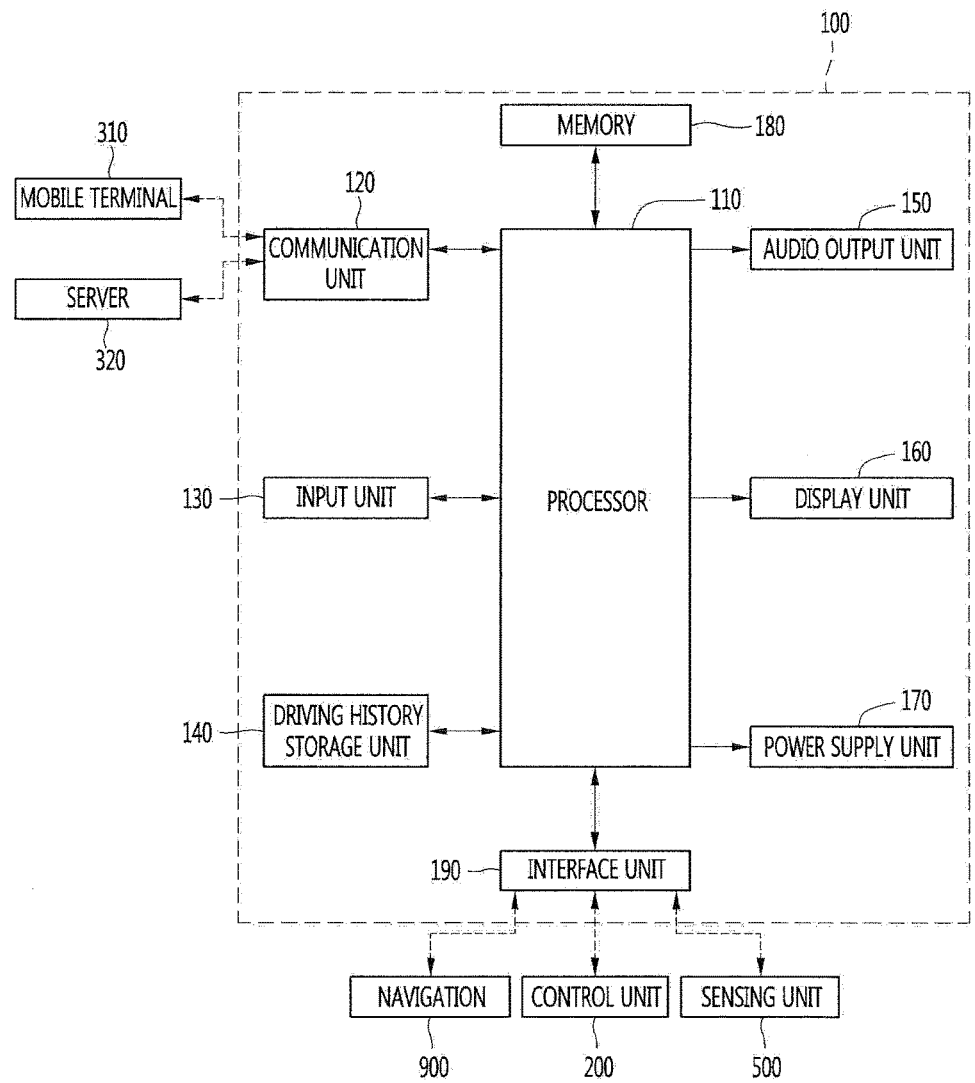
FIG. 1 is a block diagram of an assistance apparatus for driving of a vehicle according to an embodiment of the present invention.

FIG. 1 is a block diagram of an assistance apparatus for driving of a vehicle according to an embodiment of the present invention.

Referring to FIG. 1, an assistance apparatus 100 for driving of a vehicle (hereinafter, referred to as a 'vehicle driving assistance apparatus') include a processor 110, a communication unit 120, an input unit 130, a driving history storage unit 140, an audio output unit 150, a display unit 160, a power supply unit 170, a memory 180, and an interface unit 190.

The processor 110 may process a signal, data, and information, which are inputted into or outputted from the vehicle driving assistance apparatus 100 or drive an application program stored in the memory 180 to provide information or a function that is adequate for a driver.

Also, the processor 110 may control a virtual preceding vehicle (see reference numeral 2000 of FIG. 3) disposed on the display unit 160. For example, the processor 110 may change a state of the virtual preceding vehicle 2000 on the basis of route information received from the interface unit 190 and sensing information. The state of the virtual preceding may be at least one of a shape, a color, a size, a ratio, and a position.

The communication unit 120 may wirelessly transmit and receive data into/from a mobile terminal 310 or a server 320. For example, the wireless method may be at least one of mobile communication, satellite communication, and near-field communication, but is not limited thereto. Also, the communication unit 120 may receive at least one of position information of each vehicle, traffic situation information including traffic volume information, traffic accident information, weather information, emergency situation information, and the like at the present position of each vehicle, and driving history information of other vehicle from the mobile terminal 310 or the server 320.

The input unit 130 may include an image input part for inputting an image signal, an audio input part for inputting an audio signal, and a user input part for receiving information from a user. The input unit 130 may transmit collected voice data or image data to the processor 110, and the processor 110 may analyze the voice data or image data to control the vehicle.

The driving history storage unit 140 may store driving history data of an own vehicle and display the stored own vehicle driving history data on the display unit 160. For example, the own vehicle driving history data may include at least one of a driving date, a time required, a mileage, and the like, but is not limited thereto. Also, the driving history storage unit 140 may receive driving history data of other vehicle from the server 320 to store the received other vehicle driving history data and then display the stored other vehicle driving history data on the display unit 160. For example, the other vehicle driving history data may include at least one of a user name, the time required, and the mileage, but is not limited thereto.

The audio output unit 150 may output a sound to the outside on the basis of the audio signal processed in the processor 110.

The display unit 160 may display various information processed in the processor 110. The display unit may display an image related to an operation of the vehicle driving assistance apparatus 100. To display such an image, the display unit 160 may include a cluster or a head up display (HUD) on an inner front surface of the vehicle. When the HUD is provided as the display unit 160, the HUD may be disposed on a windshield of the vehicle and include a transparent film or a mirror lens. The HUD may project emergency situation notification information received from other vehicle or a mobile terminal of other vehicle to the transparent film or mirror lens to induce driver's safe driving.

The power supply unit 170 may supply power required for operating each of components by the control of the processor 110. Particularly, the power supply unit 190 may receive power from a battery provided in the vehicle.

The memory 180 may store program for processing or controlling the processor 110 and various data for an overall operation of the vehicle driving assistance apparatus 100.

The interface unit 190 may receive vehicle-related data from the control unit (see reference numeral 200 of FIG. 2), a sensing unit (see reference numeral 500 of FIG. 2), and a navigation (see reference numeral 900 of FIG. 2) or transmit a signal processed or generated in the processor 110. For example, the interface unit 190 may receive sensed information from the sensing unit 500 and also receive route information from the navigation 900. For example, the sensed information may be information sensed by a plurality of sensors (e.g., a speed sensor, a gyro sensor, a radar, a lidar, and the like), and the route information may be destination information, route information according to the destination information, map information related to the vehicle driving, or vehicle position information.

Figure 2:
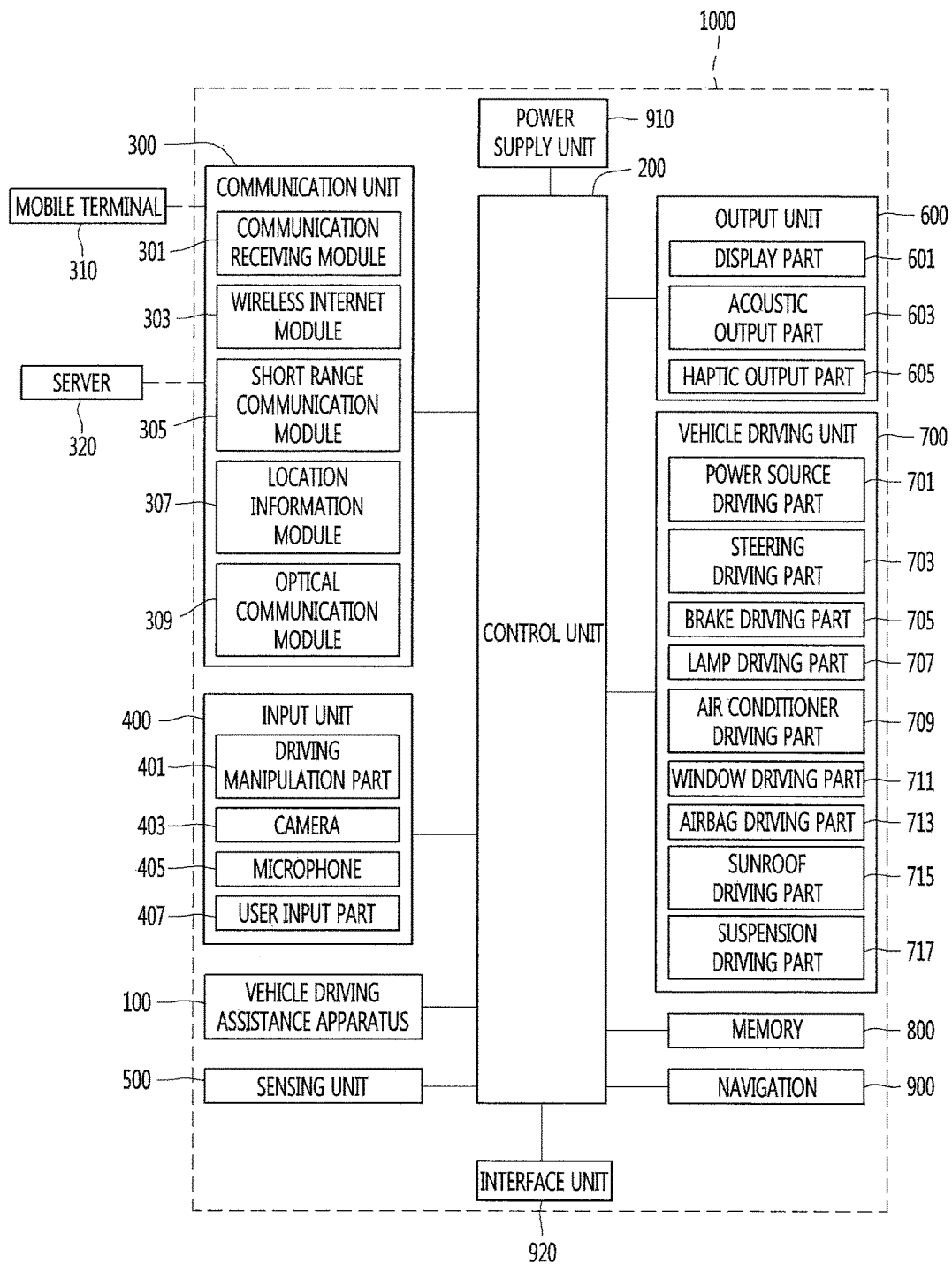
FIG. 2 is a block diagram illustrating an inner configuration of the vehicle including the assistance apparatus for the driving of the vehicle according to an embodiment of the present invention.

FIG. 2 is a block diagram illustrating an inner configuration of the vehicle including the assistance apparatus for the driving of the vehicle according to an embodiment of the present invention.

Referring to FIG. 2, a vehicle 1000 may include the vehicle driving assistance apparatus 100 illustrated in FIG. 1, a control unit 200, a communication unit 300, an input unit 400, a sensing unit 500, an output unit 600, a vehicle driving unit 700, a memory 800, a navigation 900, a power source unit 910, and an interface unit 920.

The control unit 200 may control an overall operation of each of the units within the vehicle 1000. The control unit 200 may process traffic condition information received from the communication unit 300, user input data received from the input unit 400, sensed information received from the sensing unit 500, and route information received from the navigation 900. The control unit 200 may control an overall operation of each of the units within the vehicle 1000. The control unit 200 may be called an electronic control unit (ECU).

The control unit 200 may be embodied by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing other functions.

The control unit 200 may control a virtual preceding vehicle 2000 that is driven by the vehicle driving assistance apparatus 100.

The communication unit 300 may include at least one module that facilitates wireless communication between the vehicle 1000 and the mobile terminal 310 and between the vehicle 1000 and the server 320. Also, the communication unit 300 may include at least one module connecting the vehicle 1000 to at least one network.

The communication unit 300 may include a broadcast receiving module 301, a wireless internet module 303, a short range communication module 305, a location information module 307, and an optical communication module 309.

The broadcast receiving module 301 receives a broadcast signal or broadcast-related information from an external broadcast management server through a broadcast channel. Here, the broadcast includes radio broadcast or TV broadcast.

The wireless internet module 303 may be a module for wireless internet access. The wireless internet module 303 may be embedded in the vehicle 1000 or installed in an external device. The wireless internet module 303 may transmit and receive a wireless signal in a communications network based on wireless internet technologies.

For example, examples of the wireless internet technologies may include wireless LAN (WLAN), wireless fidelity (Wi-Fi), Wi-Fi direct, digital living network alliance (DLNA), wireless broadband (WiBro), worldwide interoperability for microwave access (WiMAX), high speed downlink packet access (HSDPA), high speed uplink packet access (HSUPA), long term evolution (LTE), long term evolution-advanced (LTE-A), and the like. The wireless internet module 300 may transmit and receive data according to at least one of the foregoing wireless internet technologies and other internet technologies as well. For example, the wireless internet module 303 may wirelessly exchange data with the server 320. The wireless internet module 303 may receive weather information, traffic condition information of a road (e.g., transport protocol expert group (TPEG) information) from the server 320.

The short range communication module 305 may be configured to facilitate short range communication. The short range communication module 305 may support short range communication by using at least one of Bluetooth (Bluetooth™), radio frequency Identification (RFID), infrared data association (IrDA), ultra-wideband (UWB), ZigBee, near field communication (NFC), wireless-fidelity (Wi-Fi), Wi-Fi direct, wireless universal serial bus (Wireless USB), and the like.

The short range communication module 305 may form wireless area networks to perform short range communication between the vehicle 1000 and at least one external device. For example, the short range communication module 305 may wirelessly exchange data with the mobile terminal 310. The short range communication module 305 may receive weather information, traffic condition information of a road (e.g., transport protocol expert group (TPEG) information) from the mobile terminal 310. For example, when the user rides in the vehicle 1000, the mobile terminal 310 and the vehicle 1000 of the user may be executed automatically or executed by user's application to perform fairing therebetween.

The position information module 307 may be a module for acquiring a position of the vehicle 1000. There is a global positioning system (GPS) module as a representative example of the position information module 307. For example, when the vehicle utilizes the GPS module, a position of the vehicle may be acquired by using a signal transmitted from a GPS satellite.

The optical communication module 309 may include a light emitting part and a light receiving part.

The light receiving part may convert a light signal into an electrical signal to receive information. The light receiving part may include a photo diode (PD) for receiving light. The photo diode may convert light into an electrical signal. For example, the light receiving part may receive information of a front vehicle through light emitted from a light source provided in the front vehicle.

The light emitting part may include at least one light emitting element for converting an electrical signal into a light signal. Here, a light emitting diode (LED) may be provided as the light emitting element. The light emitting part may convert an electrical signal into a light signal to emit the converted light signal to the outside. For example, the light emitting part may emit the light signal to the outside through flickering of the light emitting element corresponding to a predetermined frequency. According to an embodiment, the light emitting part may include a plurality of light emitting element arrays. According to an embodiment, the light emitting part may be integrated with a lamp provided in the vehicle 1000. For example, the light emitting part may be at least one of a headlamp, a taillight, a stop lamp, a turn signal, and a sidelight.

The input unit 400 may include a driving manipulation part 401, a camera 403, a microphone 405, and a user input part 407.

The driving manipulation part 401 receives a user input for driving the vehicle 1000. The driving manipulation part 401 may include a steering input part, a shift input part, an acceleration input part, and a brake input part.

The camera 403 may include an image sensor and an image processing module. The camera 403 may process a still image or a moving image that is obtained by an image sensor (e.g., a CMOS or CCD). The image processing module may process the still image or the moving image that is acquired through the image sensor to extract necessary information and then transmit the extracted information to the control unit 200. The vehicle 1000 may include a camera 403 for photographing a vehicle front image or a vehicle surrounding image.

The microphone 405 may process an external acoustic signal into electrical data. The processed data may be variously utilized according to functions that are being performed in the vehicle 1000. The microphone 405 may convert a user's voice command into electrical data. The converted electrical data may be transmitted to the control unit 200.

According to an embodiment, the camera 403 or the microphone 405 may be a component provided in the sensing unit 500, but may not be a component provided in the input unit 400.

The user input part 407 is configured to receive information from the user. When information is inputted through the input part 407, the control unit 200 may control an operation of the vehicle 1000 to correspond to the inputted information. The user input part 407 may include a touch type input part or a mechanical input part. According to an embodiment, the user input part 407 may be disposed on one area of a steering wheel. In this case, the driver may manipulate the user input part 407 by using a finger thereof in a state in which the driver holds the steering wheel.

The sensing unit 500 senses a signal related to traveling of the vehicle 1000. For this, the sensing unit 500 may include a crash sensor, a wheel sensor, a speed sensor, a tilt sensor, a weight sensor, a heading sensor, a yaw sensor, a gyro sensor, a position module, a vehicle forward movement/backward movement sensor, a battery sensor, a fuel sensor, a tire sensor, a steering sensor by rotation of a handle, an in-vehicle temperature sensor, an in-vehicle humidity sensor, an ultrasonic sensor, a radar, a lidar, and the like.

Thus, the sensing unit 500 may acquire sensing signals with respect to vehicle crush information, vehicle direction information, vehicle position information (GPS information), vehicle angle information, vehicle speed information, vertical acceleration information, vehicle tilt information, vehicle forward movement/backward movement information, battery information, fuel information, tire information, vehicle lamp information, in-vehicle temperature information, in-vehicle humidity information, a steering wheel rotation angle, and the like.

The sensing unit 500 may further include an acceleration pedal sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The sensing unit 500 may include a biometric information sensing part. The biometric information sensing part senses and acquires biometric information of a passenger. The biometric information may include fingerprint information, iris-scan information, retina-scan information, hand geo-metry information, facial recognition information, and voice recognition information. The biometric information sensing part may include a sensor for sensing the biometric information of the passenger. The biometric information sensing part may acquire the hand geo-metry information and the facial recognition information through an inner camera 195c.

The output unit 600 may be configured to output information processed in the control unit 200 and include a display part 601, an acoustic output part 603, and a haptic output part 605.

The display part 601 may display information processed in the control unit 200. For example, the display part 601 may display vehicle-related information. Here, the vehicle-related information may include vehicle control information for direct control of the vehicle or vehicle driving assistance information for driving guidance to the vehicle driver. Also, the vehicle-related information may include vehicle condition information for notifying conditions of the present vehicle or vehicle driving information related to the driving of the vehicle.

The display part 601 may include at least one of a liquid crystal display (LCD), a thin film transistor-liquid crystal display (TFT LCD), an organic light-emitting diode (OLED), a flexible display, a 3D display, and an E-ink display.

The display part 601 may form a layered structure together with a touch sensor or be integrated with the touch sensor to realize a touch screen. The touch screen may serve as a user input part 407 that provides an input interface between the vehicle 1000 and the user and also provide an output interface between the vehicle 1000 and the user. In this case, the display part 601 may include the touch sensor for sensing touch on the display part 601 to receive a control command in a touch manner. Thus, when the touch is performed on the display part 601, the touch sensor may sense the touch, and the control unit 200 may generate a control command corresponding to the touch according to the touch on the display part 601. Contents inputted by the touch manner may include characters or figures or menu items that are capable of being indicated or designated in various modes.

The display part 601 may include a cluster to allow the driver to confirm the vehicle condition information or the vehicle driving information just when the driver drives the vehicle. The cluster may be disposed on a dashboard. In this case, the driver may confirm information displayed on the cluster in a state in which the driver maintains his sight to the front side.

According to an embodiment, the display part 601 may be realized by using a head up display (HUD). When the display part 601 is realized by using the HUD, information may be outputted through the transparent display provided on the windshield. Alternatively, the display part 601 may output information through an image that is projected on the windshield by providing a projection module.

The acoustic output part 603 may convert an electrical signal transmitted from the control unit 200 into an audio signal and then output the converted audio signal. For this, the acoustic output part 603 may include a speaker. The acoustic output 603 may output a sound corresponding to an operation of the user input part 407.

The haptic output part 605 generates a tactile output. For example, the haptic output part 605 may operate to vibrate a steering wheel, a safety belt, and a sheet, thereby allowing the user to recognize the output.

The vehicle driving unit 700 may control operations of various units of the vehicle. The vehicle driving unit 700 may include a power source driving part 701, a steering driving part 703, a brake driving part 705, a lamp driving part 707, an air conditioner driving part 709, a window driving part 711, an airbag driving part 713, a sunroof driving part 715, and a suspension driving part 717.

The power source driving part 701 may perform an electronic control with respect to a power source within the vehicle 1000.

The steering driving part 703 may perform an electronic control with respect to a steering apparatus within the vehicle 1000. Thus, the heading direction of the vehicle may be changed.

The brake driving part 705 may perform an electronic control with respect to a brake apparatus (not shown) within the vehicle 1000. For example, the brake driving part 705 may control an operation of a brake disposed on a wheel to reduce a speed of the vehicle 1000. For another example, the brake driving part 705 may differently control operations of the brakes respectively disposed on left and right wheels to adjust the heading direction of the vehicle 1000 to a left or right direction.

The lamp driving part 707 may control an turn on/turn off of a lamp disposed on each of the inside and outside of the vehicle. Also, the lamp driving part 707 may control light intensity and direction of the lamp. For example, the lamp driving part 707 may perform a control of each of a turn signal lamp and a brake lamp.

The air conditioner driving part 709 may perform an electronic control with respect to an air conditioner (not shown) within the vehicle 1000. For example, if an inner temperature of the vehicle is high, the air conditioner may operate to control supply of cool air into the vehicle.

The window driving part 711 may perform an electronic control with respect to a window apparatus within the vehicle 1000. For example, the window driving part 711 may control an opening or closing of each of left and right windows disposed on side surfaces of the vehicle 1000.

The airbag driving part 713 may perform an electronic control with respect to an airbag apparatus within the vehicle 1000. For example, the airbag driving part 713 may control so that an airbag is inflated in emergency.

The sunroof driving part 715 may perform an electronic control with respect to a sunroof apparatus (not shown) within the vehicle 1000. For example, the sunroof driving part 715 may control an opening or closing of a sunroof.

The suspension driving part 715 may perform an electronic control with respect to a suspension apparatus (not shown) within the vehicle 1000. For example, when a curved road exists, the suspension driving part 715 controls the suspension apparatus reduce vibration of the vehicle 1000.

The memory 800 may store various data for an overall operation of the vehicle 1000 such as program for processing or controlling the control unit 200.

The navigation 900 may transmit/receive set destination information, route information according to the destination, map information related to the vehicle driving, or vehicle position information from/into the control unit 200.

The power source unit 910 may supply power required for operating each of components under the control of the processor 200. Particularly, the power supply unit 910 may receive power from a battery (not shown) provided in the vehicle 1000.

The interface unit 920 may serve as a passage for various kinds of external devices connected to the vehicle 1000. For example, the interface unit 920 may include a port that is connectable to the mobile terminal 310 and be connected to the mobile terminal 310 through the port. In this case, the interface unit 920 may exchange data with the mobile terminal 310.

The interface unit 920 may serve as a passage for supplying electric energy to the mobile terminal 310 connected thereto. When the mobile terminal 310 is electrically connected to the interface unit 920, the interface unit 920 provides the electric energy supplied from the power source unit 910 to the mobile terminal 600 under the control of the control unit 200.

Figure 3:
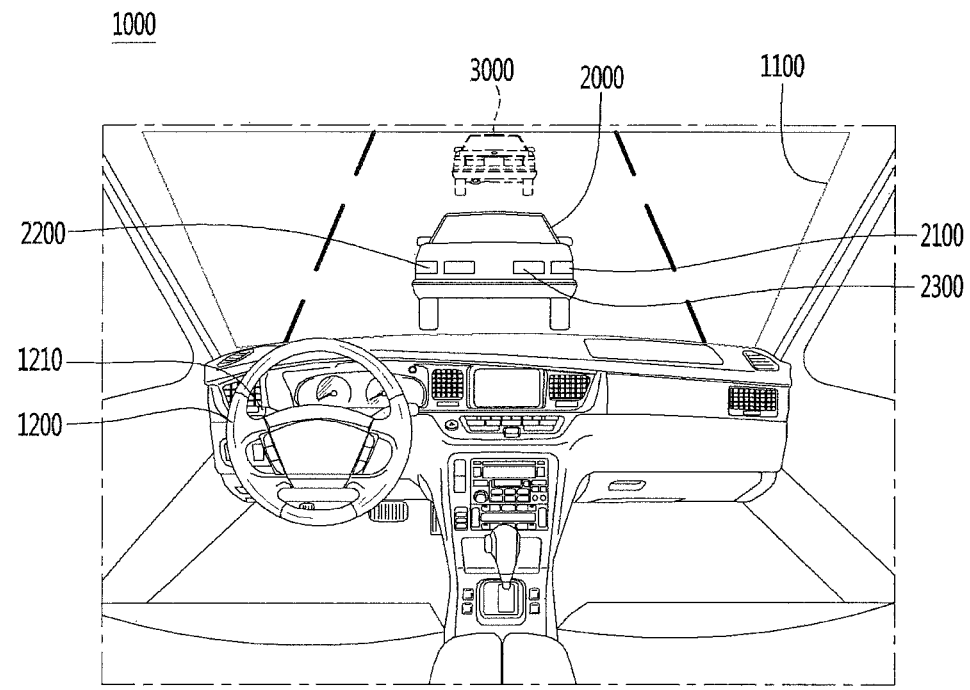
FIG. 3 is a view illustrating the inside of the vehicle according to an embodiment of the present invention.

FIG. 3 is a view illustrating the inside of the vehicle according to an embodiment of the present invention.

The vehicle 1000 may include a windshield 1100 disposed on the front surface, a steering input unit 120 for adjusting a heading direction of the vehicle 1000, and a turn signal lever 1210 for manipulating the turn signal of the vehicle 1000.

According to an embodiment, the virtual preceding vehicle 2000 may be displayed so that the virtual preceding vehicle 2000 is disposed between other vehicle 3000 and the vehicle 1000 to assist the driving of the driver.

Figure 4:
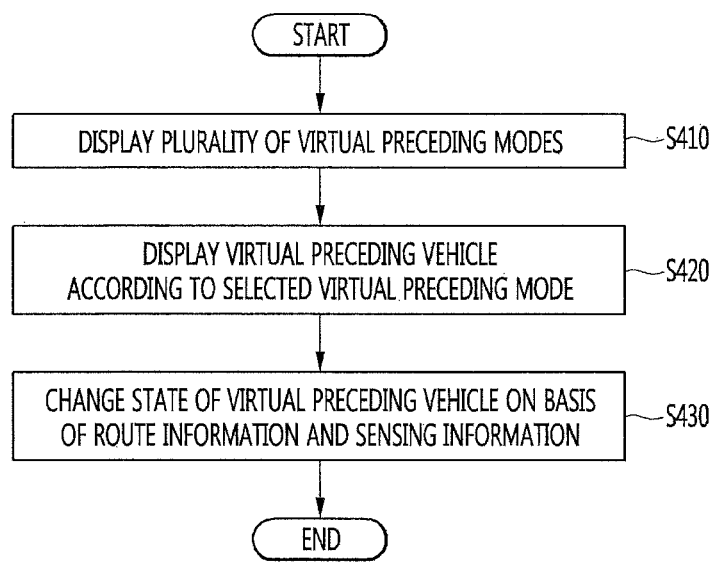
FIG. 4 is a flowchart for explaining an operation for selecting a virtual preceding mode according to an embodiment of the present invention.
Figure 5:
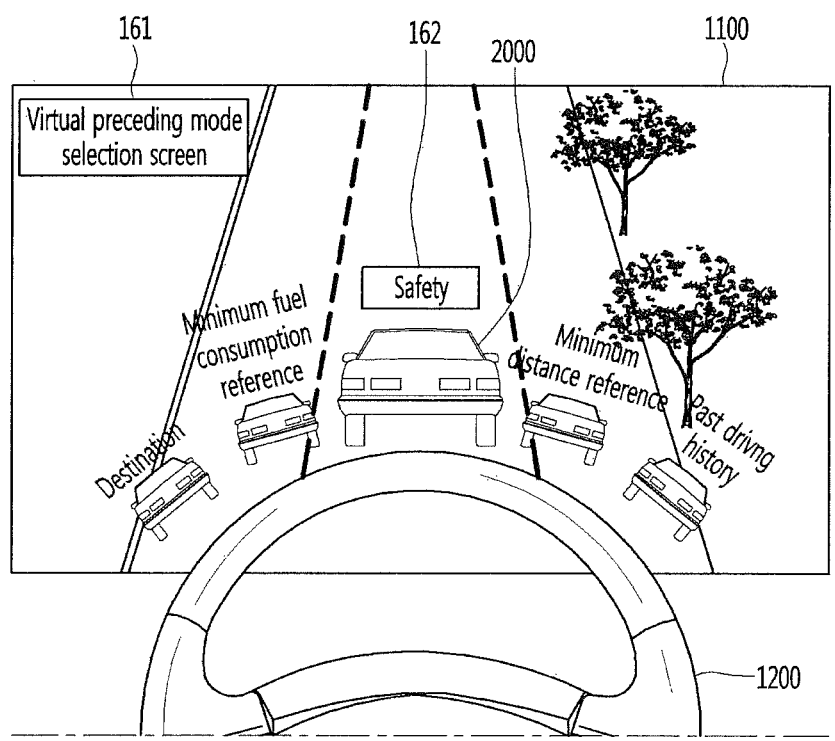
FIG. 5 is a front view of a display unit that displays a plurality of virtual preceding modes according to an embodiment of the present invention.

FIG. 4 is a flowchart for explaining an operation for selecting a virtual preceding mode according to an embodiment of the present invention, and FIG. 5 is a front view of a display unit that displays a plurality of virtual preceding modes according to an embodiment of the present invention.

Referring to FIGS. 4 and 5, a processor 110 may display a plurality of virtual preceding modes on a display unit 160 (S410). The plurality of virtual preceding modes may include a destination mode, a minimum fuel consumption preference mode, a safety mode, a minimum distance preference mode, and a past driving history mode, but is not limited thereto.

The processor 110 may receive a selected virtual preceding mode of the plurality of virtual preceding modes from an input unit 130. Here, the input unit 130 may perform an input through a voice input of a driver, a manipulation of a steering input unit 1200, and a touch manipulation, but is not limited thereto. For example, referring to FIG. 5, although the virtual preceding mode is basically set as the safety mode, when the driver moves the steering input unit 1200 to a right direction, the virtual preceding mode may be changed and set to the minimum fuel consumption preference mode. When the driver moves the steering input unit 1200 to a left direction, the virtual preceding mode may be changed and set to the minimum distance preference mode.

The processor 110 may display a virtual preceding vehicle 2000 corresponding to the virtual preceding mode selected by the driver (S420).

When the driving of the vehicle 1000 is started, the processor 110 may change a state of the virtual preceding vehicle 2000 on the basis of route information and sensing information received from an interface unit 190. The state may be at least one of a shape, a color, a size, a ratio, and a position of the virtual preceding vehicle 2000. That is, when the driving of the vehicle 1000 is started, the virtual preceding vehicle 2000 may perform a function for guiding the vehicle 1000 at the front of the vehicle 1000 so that the vehicle 1000 is safely driven up to the destination.

Figure 6:
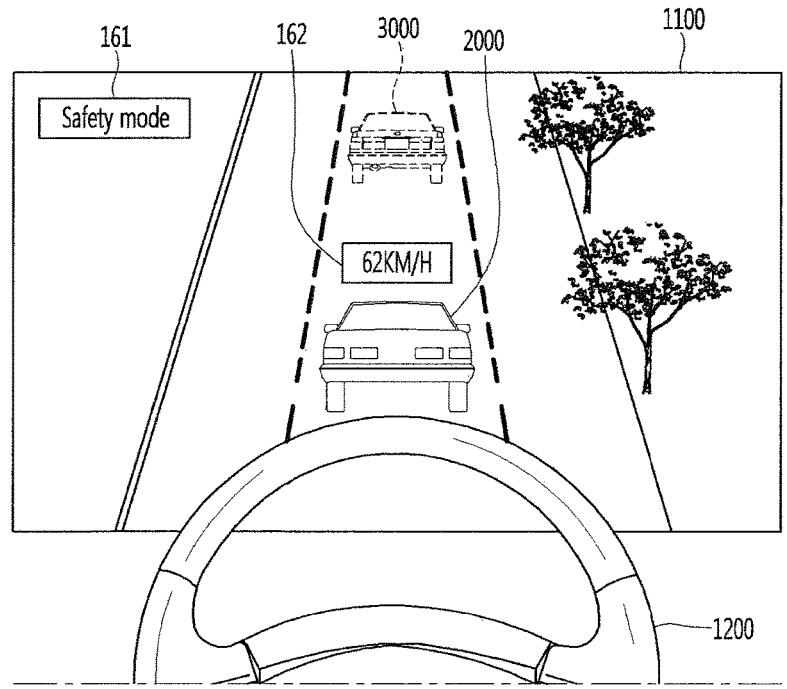
FIG. 6 is a front view of the display unit that displays a virtual preceding vehicle in a safety mode according to an embodiment of the present invention.

FIG. 6 is a front view of the display unit, which displays a virtual preceding vehicle in the safety mode according to an embodiment of the present invention.

Referring to FIG. 6, the processor 110 may display the virtual preceding vehicle 200 between other vehicle 3000 and the vehicle 1000 on the display unit 160 when the virtual preceding mode is the safety mode.

The display unit 160 may include a first guidance window 161 and a second guidance window 162. The first guidance window 161 may display the present virtual preceding mode, and the second guidance window 162 may display speed information of the virtual preceding vehicle 2000. However, an embodiment is not limited to the information displayed on the first and second guidance windows 161 and 162.

Figure 7:
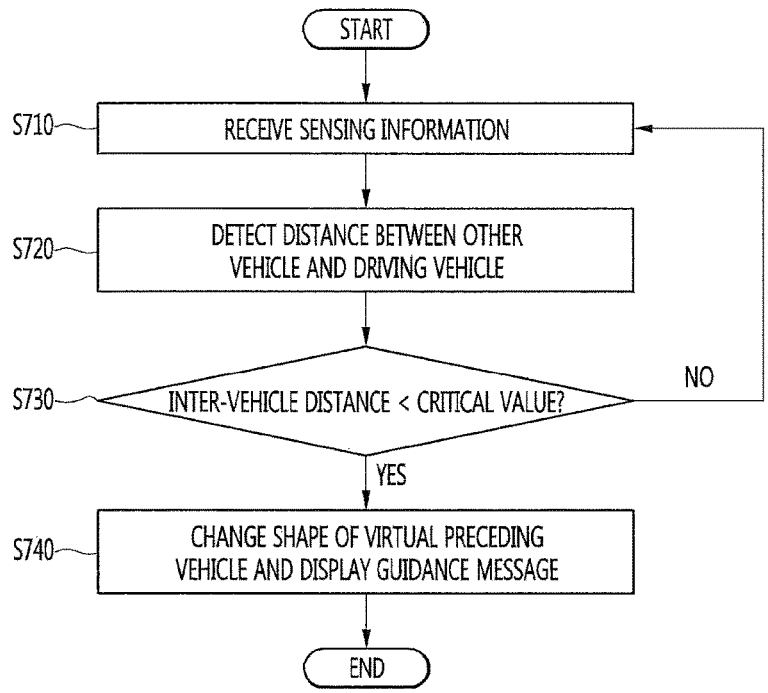
FIG. 7 is a flowchart for explaining an operation of the virtual preceding vehicle for assuring a safety distance according to an embodiment of the present invention.
Figure 8:
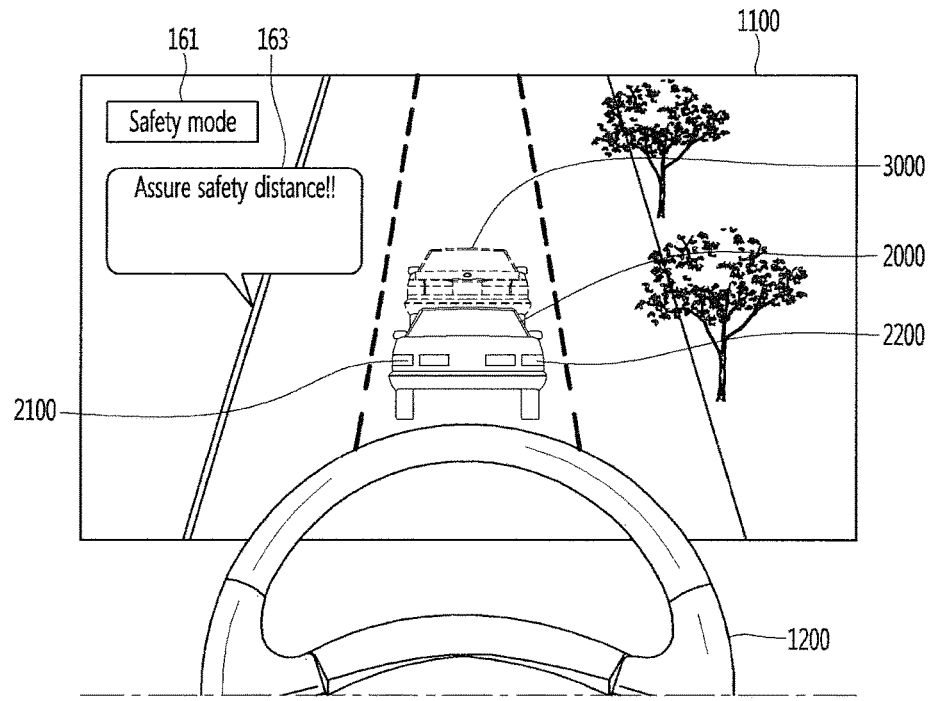
FIG. 8 is a front view of the display unit that displays the virtual preceding vehicle for assuring the safety distance according to an embodiment of the present invention.

FIG. 7 is a flowchart for explaining an operation of the virtual preceding vehicle for assuring a safety distance according to an embodiment of the present invention, and FIG. 8 is a front view of the display unit that displays the virtual preceding vehicle for assuring the safety distance according to an embodiment of the present invention.

Referring to FIGS. 7 and 8, the processor 110 may receive sensing information from an interface unit 190 (S710). For example, the sensing information may include position information of the vehicle 1000 and position information of other vehicle 3000. The processor 110 may detect a distance between the other vehicle 3000 and the vehicle 1000 through the sensing information (S720).

The processor 110 may change a shape of the virtual preceding vehicle 2000 to display a guidance message when the detected distance is less than a critical value (S740). Here, the critical value may be a preset value or a value received from a communication unit 120. That is, the processor 110 may control the shape of the virtual preceding vehicle 2000 so that the virtual preceding vehicle 200 gradually approaches the vehicle 1000 or is gradually increased in size. Also, the color of the virtual preceding vehicle 2000 may be changed, and emergency lamps 2100 and 2200 of the virtual preceding vehicle 2000 may be turned on. The guidance message may be displayed on a message window 163 to transmit information to the driver.

Figure 9:
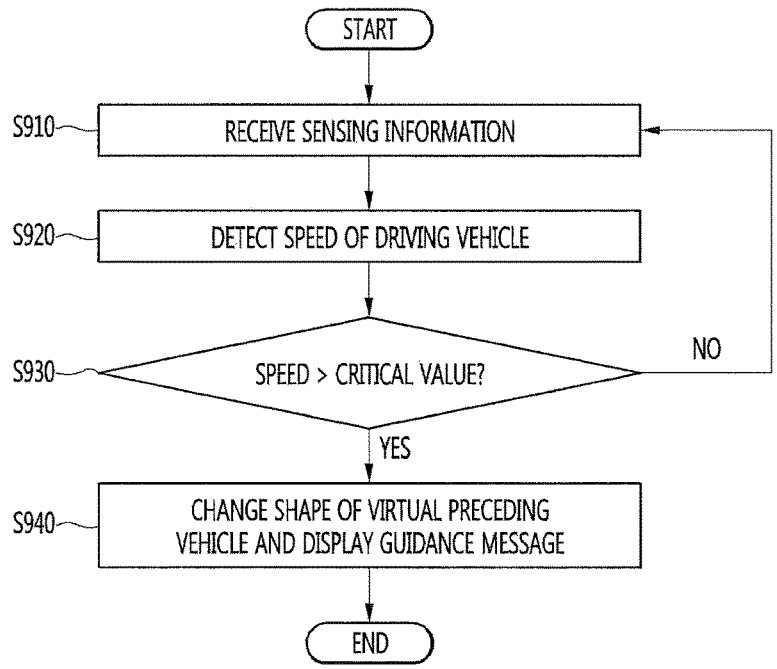
FIG. 9 is flowchart for explaining an operation for observing a speed limit according to an embodiment of the present invention.
Figure 10:
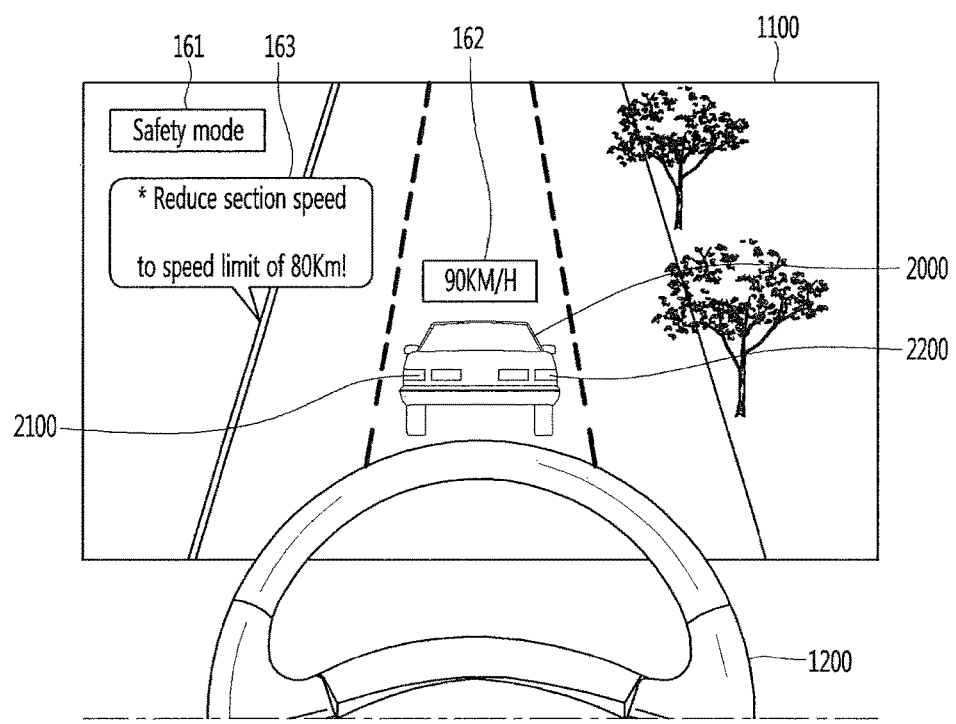
FIG. 10 is a front view of the display unit that displays the virtual preceding vehicle for observing the speed limit according to an embodiment of the present invention.

FIG. 9 is flowchart for explaining an operation for observing a speed limit according to an embodiment of the present invention, and FIG. 10 is a front view of the display unit that displays the virtual preceding vehicle for observing the speed limit according to an embodiment of the present invention.

Figure 11:
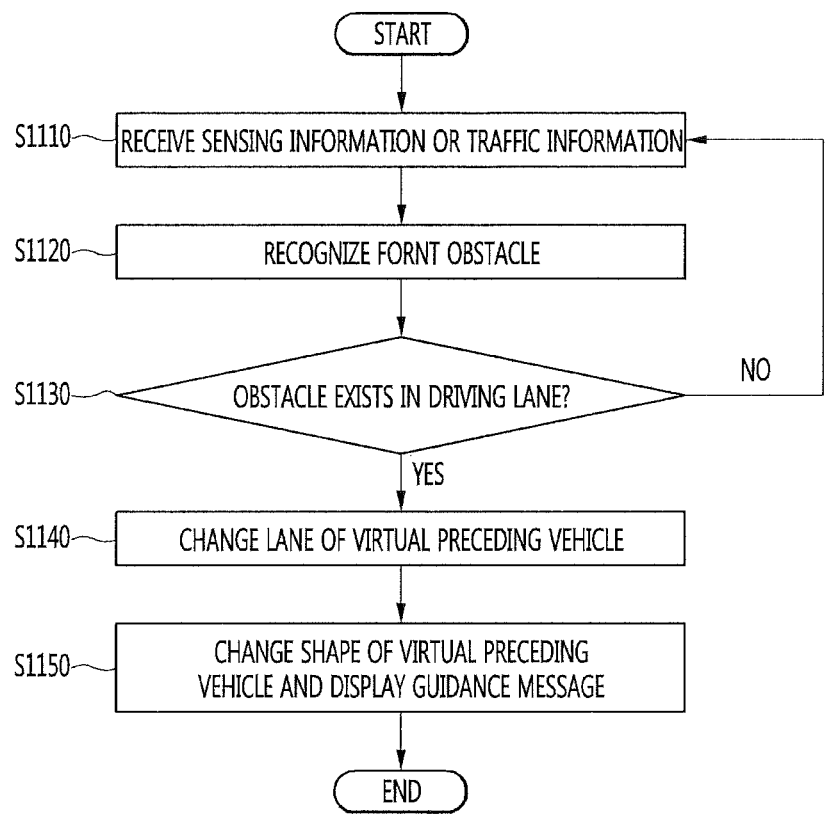
FIG. 11 is a flowchart for explaining an operation of the virtual preceding vehicle for avoiding an obstacle according to an embodiment of the present invention.

Referring to FIGS. 9 and 11, the processor 110 may receive sensing information from the interface unit 190 (S910). For example, the sensing information may include speed information of the vehicle 1000 and position information of the vehicle 1000. The processor 110 may interpret the sensing information to detect driving speed of the vehicle 1000 (S920).

The processor 110 may change the shape of the virtual preceding vehicle 200 and display a guidance message when the driving speed is greater than the critical value (S930). For example, the processor 110 may receive and set speed limit information of a corresponding section, which is included in the received traffic condition information.

For example, the processor 110 may control the shape of the virtual preceding vehicle 2000 so that the virtual preceding vehicle 200 gradually approaches the vehicle 1000 or is gradually increased in size. Also, the color of the virtual preceding vehicle 2000 may be changed, and the emergency lamps 2100 and 2200 of the virtual preceding vehicle 2000 may be turned on.

The guidance message may be displayed on the message window 163 to transmit information to the driver.

Figure 12:
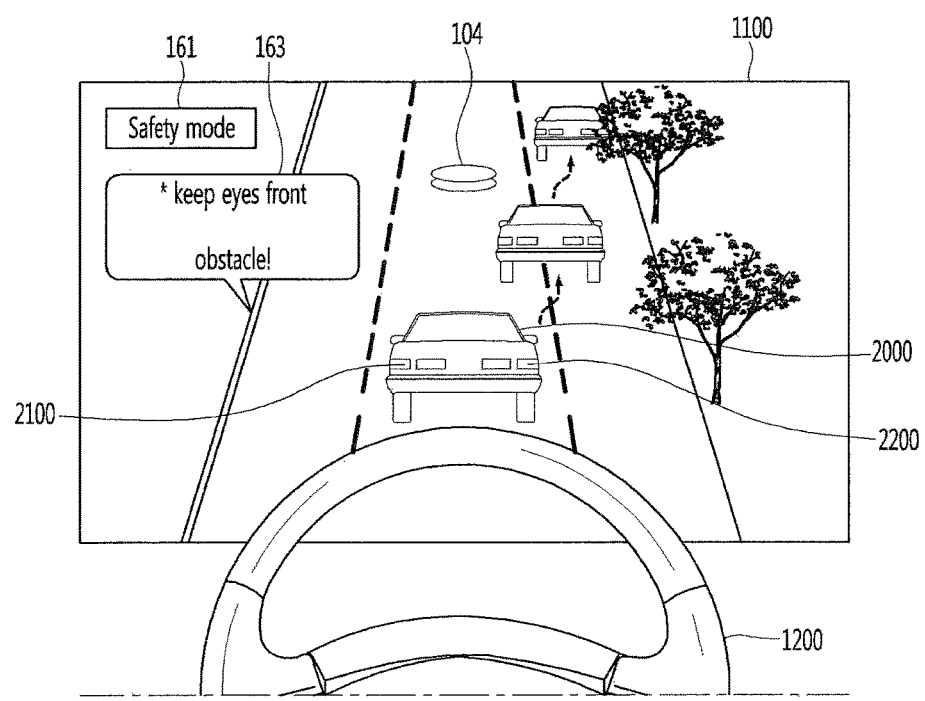
FIG. 12 is a front view of the display unit that displays the virtual preceding vehicle for avoiding the obstacle according to an embodiment of the present invention.

FIG. 11 is a flowchart for explaining an operation of the virtual preceding vehicle for avoiding an obstacle according to an embodiment of the present invention, and Fig. 12 is a front view of the display unit that displays the virtual preceding vehicle for avoiding the obstacle according to an embodiment of the present invention.

Referring to FIGS. 11 and 12, the processor 110 may receive the sensing information from the interface unit 190 or receive the traffic condition information from the communication unit (S1110). For example, the traffic condition information may include at least one of traffic information, traffic accident information, weather information, and emergency situation information.

The processor 110 may interpret the sensing information and the traffic condition information to detect a front obstacle (S1120). The obstacle 104 may be one of a sink hole, a falling rock, and a lost article, but is not limited thereto. When the obstacle is detected in a driving lane for the vehicle 1000, the processor 110 may control the virtual preceding vehicle 2000 so that the lane for the virtual preceding vehicle 2000 is changed to allow the vehicle 1000 to avoid the obstacle (S1140). In addition, the processor 110 may control the virtual preceding vehicle 2000 to change the shape of the virtual preceding vehicle 2000 and display the guidance message.

That is, the processor 110 may interpret the sensing formation and the traffic condition information to determine a time point at which the lane change is enabled. When it is determined that the lane change is enabled, the turn signal of the virtual preceding vehicle 2000 may be turned on, and then the lane may be changed. Here, the guidance message may be displayed on the message window 163 to transmit the information to the driver.

According to an embodiment, the processor 110 may change the shape of the virtual preceding vehicle 2000 to display a guidance message when deteriorating weather conditions such as thick foggy and heavy snow are detected at a position, at which the vehicle 1000 is located, through the traffic condition information. For example, the processor 110 may control the shape of the virtual preceding vehicle 2000 so that the virtual preceding vehicle 200 gradually approaches the vehicle 1000 or is gradually increased in size. Also, the color of the virtual preceding vehicle 2000 may be changed, and the emergency lamps 2100 and 2200 of the virtual preceding vehicle 2000 may be turned on.

According to an embodiment, the processor 110 may change the shape of the virtual preceding vehicle 2000 and display a guidance message when an emergency situation is detected at the front of the vehicle 1000 through the traffic condition information. For example, the processor 110 may control the shape of the virtual preceding vehicle 2000 so that the virtual preceding vehicle 200 gradually approaches the vehicle 1000 or is gradually increased in size. For example, the processor 110 may control the shape of the virtual preceding vehicle 2000 so that the virtual preceding vehicle 200 gradually approaches the vehicle 1000 or is gradually increased in size.

Figure 13:
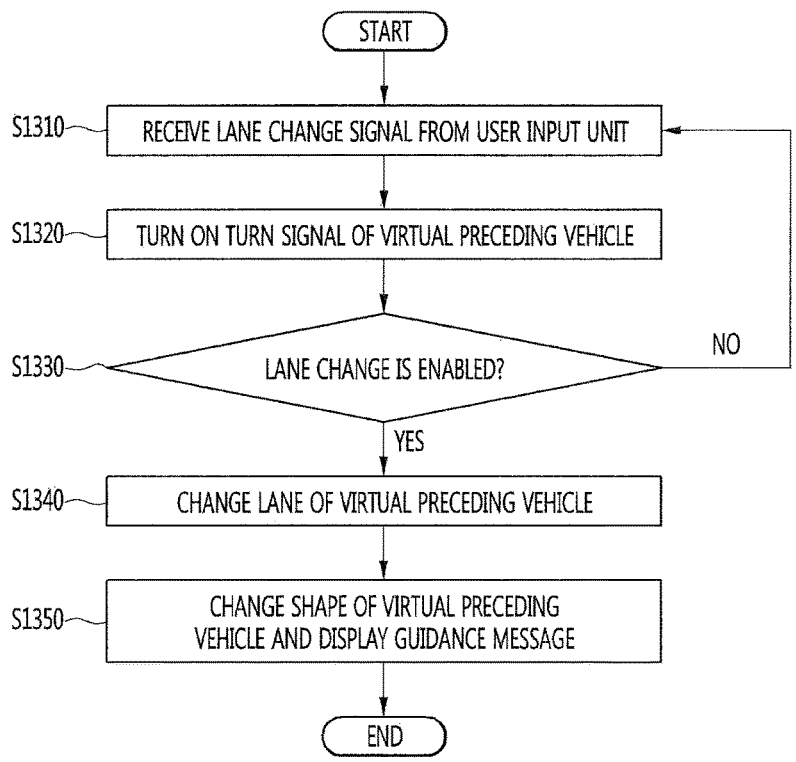
FIG. 13 is a flowchart for explaining an operation of the virtual preceding vehicle for changing a lane according to an embodiment of the present invention.
Figure 14:
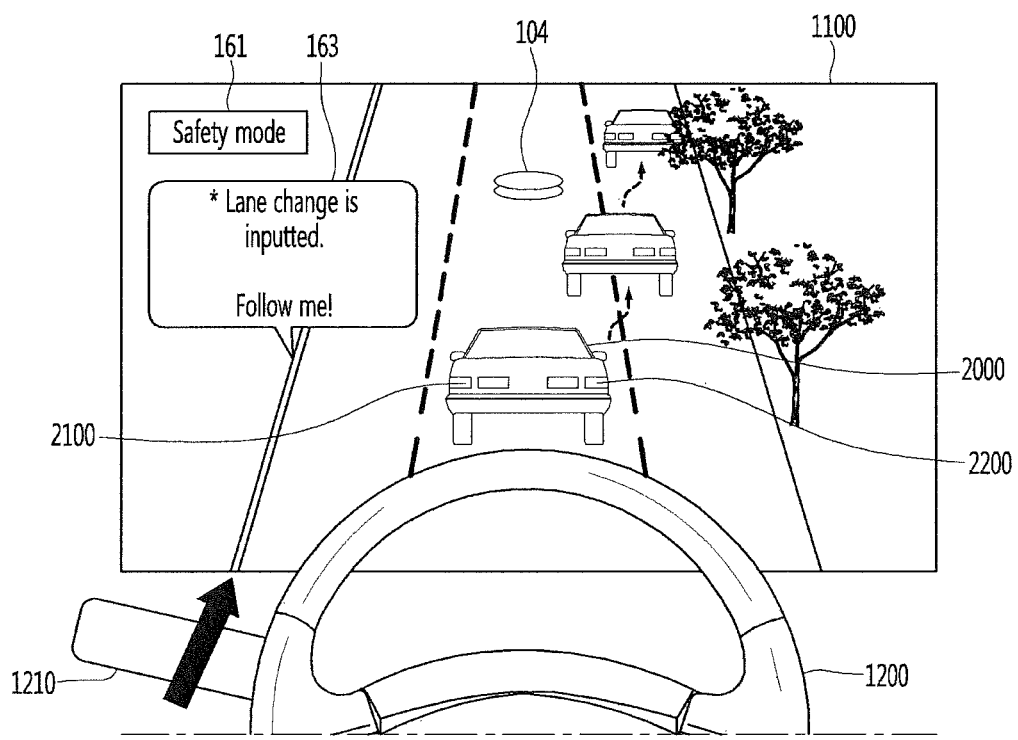
FIG. 14 is a front view of the display unit that displays the virtual preceding vehicle for changing the lane according to an embodiment of the present invention.

FIG. 13 is a flowchart for explaining an operation of the virtual preceding vehicle for changing a lane according to an embodiment of the present invention, and FIG. 14 is a front view of the display unit that displays the virtual preceding vehicle for changing the lane according to an embodiment of the present invention.

Referring to FIGS. 13 and 14, the processor 110 may receive a land change signal from the input unit 130 (S1310). Here, the input unit 130 may perform an input through the steering input unit 1200 and the turn signal lever 1210. The processor 110 may turn the turn signal 2100 or 2200 of the virtual preceding vehicle 2000 according to the lane change signal (S1320).

For example, when the driver moves the turn signal lever 1210 upward to change the lane to a right direction, the processor 110 may interpret the sensing information and the traffic condition information to determine a lane change enable time point of the virtual preceding vehicle 2000 (S1330) and control the virtual preceding vehicle 2000 to change the lane of the virtual preceding vehicle 2000 at the lane change enable time point. That is, the driver of the vehicle 1000 may safely change the lane according to the guidance of the virtual preceding vehicle 2000.

Figure 15:
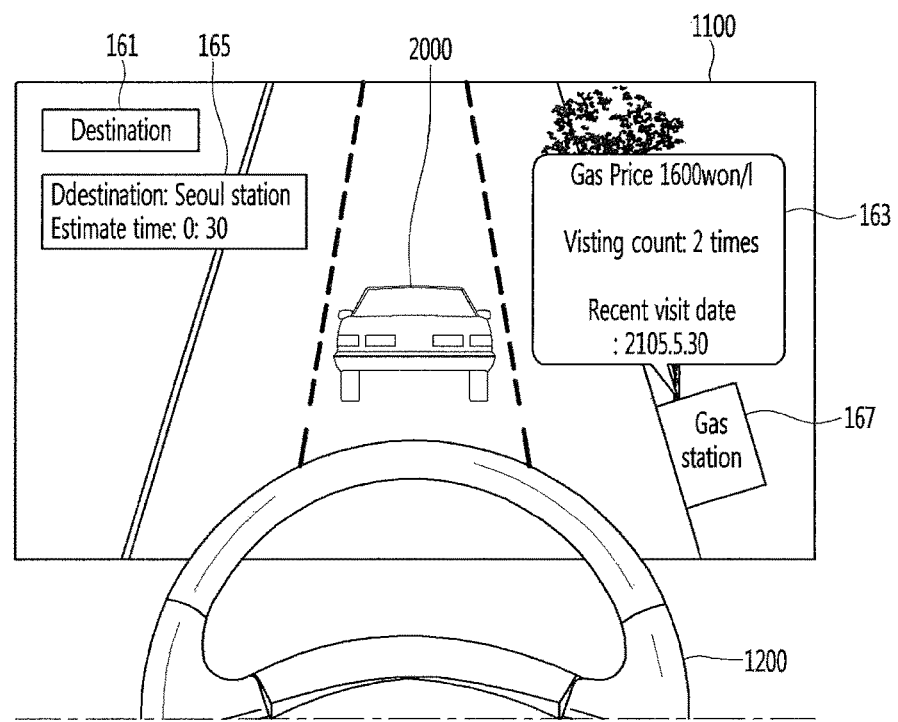
FIG. 15 is a front view of the display unit that displays the virtual preceding vehicle in a destination mode according to an embodiment of the present invention.

FIG. 15 is a front view of the display unit that displays the virtual preceding vehicle in the destination mode according to an embodiment of the present invention.

Referring to FIG. 15, when the virtual preceding mode is the destination mode, the route information received from the interface unit 190 may be displayed on the display unit 160. For example, the display unit 160 may include a first guidance window 161 and a third guidance window 165. The first guidance window 161 may display the present virtual preceding mode, and the third guidance window 165 may display the route information. The route information may be one of the destination information and an arrival estimate time, but is not limited thereto.

According to an embodiment, when the virtual preceding mode is the minimum fuel consumption preference mode, the route information received from the interface unit 190 may be displayed on the display unit 160. The route information may include a route along which the vehicle arrives at the destination at minimum fuel consumption.

According to an embodiment, when the virtual preceding mode is the minimum distance preference mode, the route information received from the interface unit 190 may be displayed on the display unit 160. The route information may include a route along which the vehicle arrives at the destination at minimum fuel consumption.

That is, the minimum fuel consumption preference mode and the minimum distance preference mode may be different from the destination mode in route.

According to an embodiment, the processor 110 may display information related to a point of interest (POI) of the driver on the message window 163 of the display unit 160 when the vehicle 1000 is located at the POI during the driving. For example, when the POI is a gas station, the related information may be information such as a gas price, a visiting count, and a recent visit date.

Figure 16:
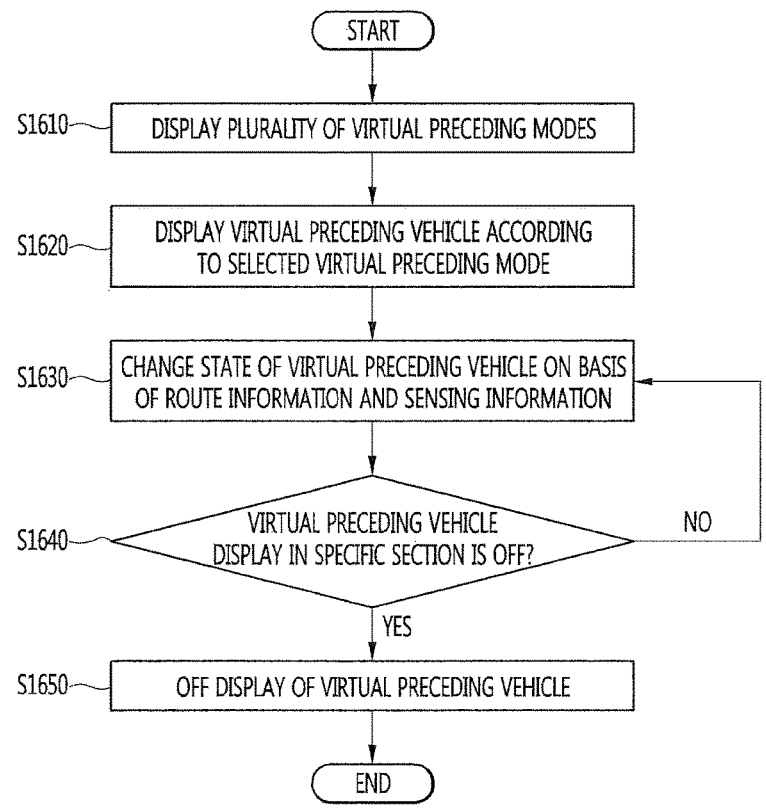
FIG. 16 is a flowchart for explaining an operation for turning off a display of the virtual preceding vehicle according to an embodiment of the present invention.
Figure 17:
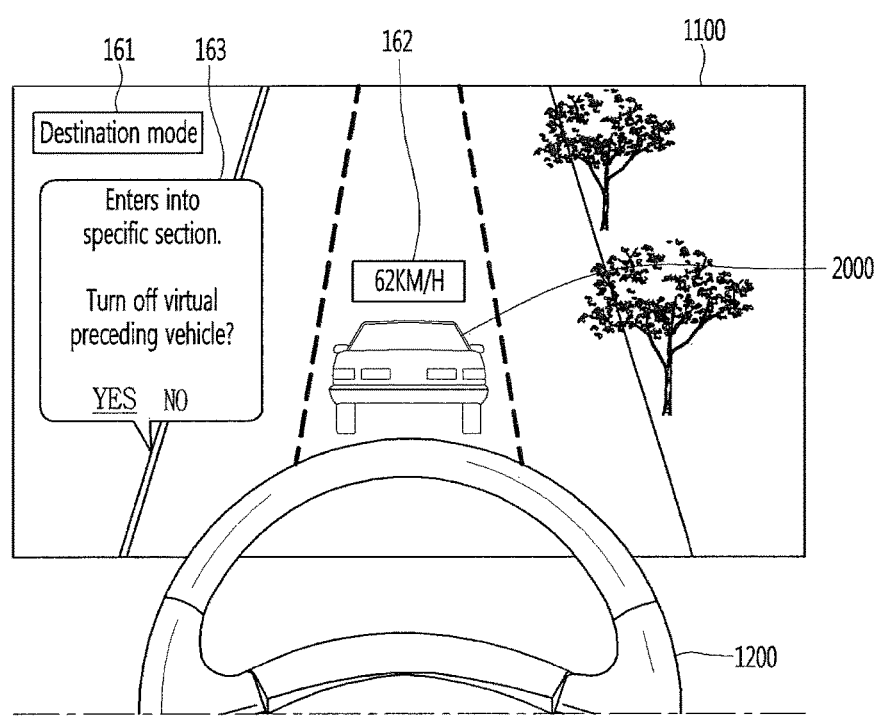
FIG. 17 is a front view of the display unit that displays a guidance message for turning off the display of the virtual preceding vehicle according to an embodiment of the present invention.

FIG. 16 is a flowchart for explaining an operation for turning off a display of the virtual preceding vehicle according to an embodiment of the present invention, and Fig. 17 is a front view of the display unit that displays a guidance message for turning off the display of the virtual preceding vehicle according to an embodiment of the present invention.

Referring to FIGS. 16 and 17, the processor 110 may display the plurality of virtual preceding modes on the display unit 160 (S1610). The plurality of virtual preceding modes may include a destination mode, a minimum distance preference mode, a minimum fuel consumption preference mode, a safety mode, and a past driving history mode, but is not limited thereto.

The processor 110 may display a virtual preceding vehicle 2000 corresponding to the virtual preceding mode selected by the driver on the display unit 160 (S1620).

When the driving of the vehicle 1000 is started, the processor 110 may change a state of the virtual preceding vehicle 2000 on the basis of the route information and sensing information received from the interface unit 190 (S1630). That is, when the driving of the vehicle 1000 is started, the virtual preceding vehicle 2000 may be safely driven up to the destination according to the guidance of the virtual preceding vehicle 2000.

When the vehicle 1000 enters into a specific section during the driving, the processor 110 may display the display or not of the virtual preceding vehicle 2000 on the display unit 160 (S1640). The specific section may be a section that is preset by the user. When the driver turns off the display of the virtual preceding vehicle, the processor 110 may turn off the display of the virtual preceding vehicle 2000 (S1650).

Figure 18:
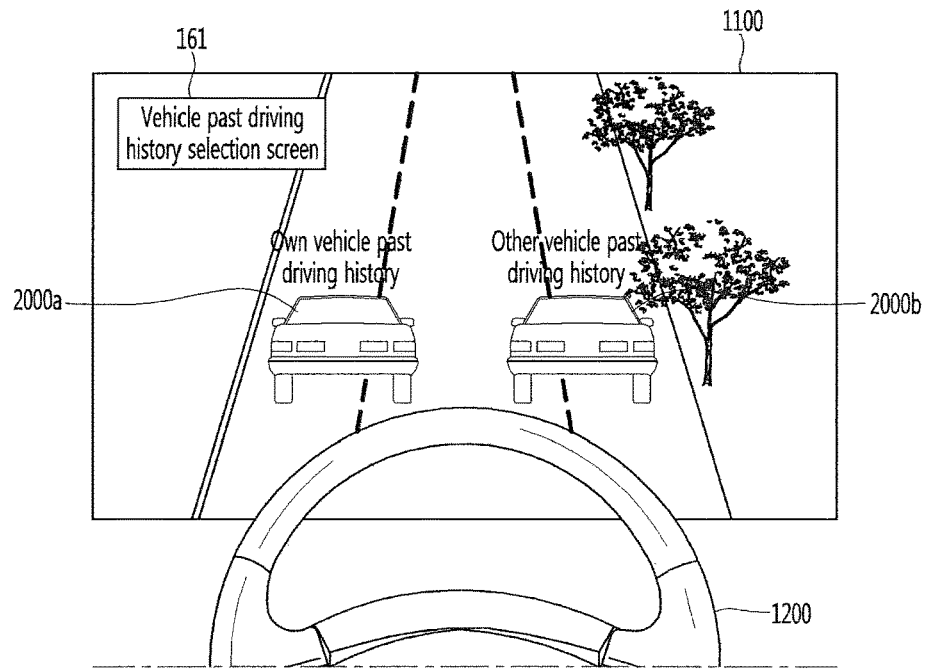
FIG. 18 is a front view of the display unit for selecting a past driving history mode of the vehicle according to an embodiment of the present invention.

FIG. 18 is a front view of the display unit that selects the past driving history mode of the vehicle according to an embodiment of the present invention.

Referring to FIG. 18, when the virtual preceding mode is the past driving history mode, the processor 110 may display an own vehicle past driving history mode and other vehicle past driving history mode on the display unit 160 to select the own vehicle past driving history mode and the other vehicle past driving history mode.

Figure 19:
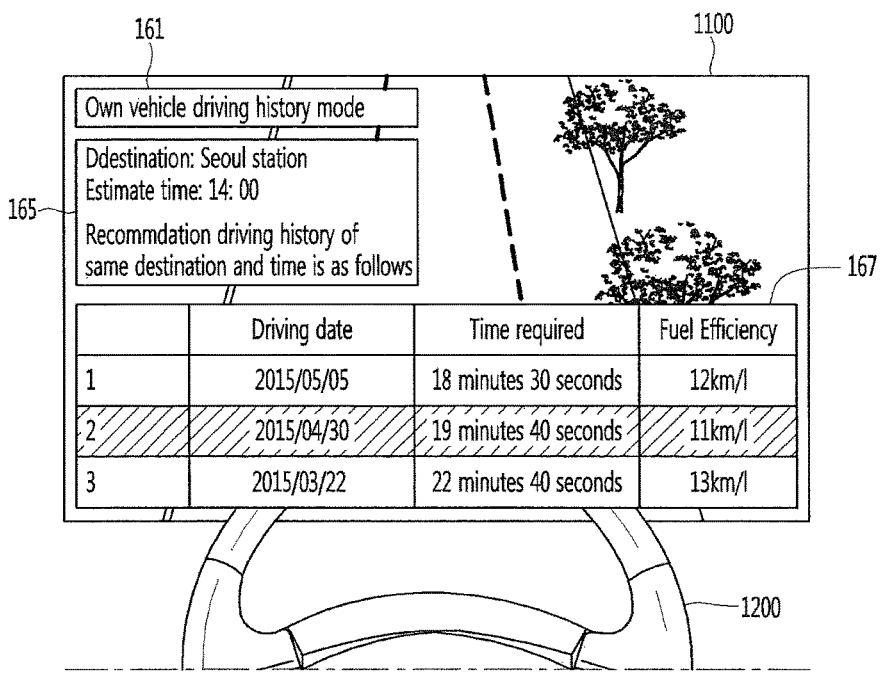
FIG. 19 is a front view of the display unit that is selected to a past driving history mode of an own vehicle according to an embodiment of the present invention.
Figure 20:
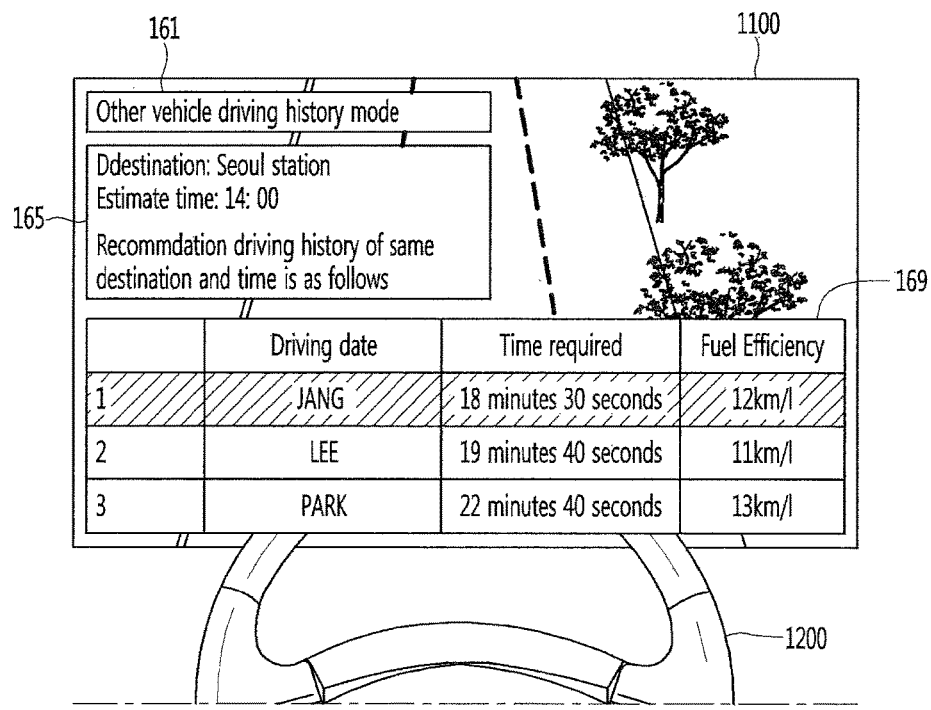
FIG. 20 is a front view of the display unit that is selected to a past driving history mode of other vehicle according to an embodiment of the present invention.

FIG. 19 is a front view of the display unit that is selected to the own vehicle past driving history mode according to an embodiment of the present invention, and FIG. 20 is a front view of the display unit that is selected to the other vehicle past driving history mode according to an embodiment of the present invention.

Referring to FIGS. 19 and 20, when the virtual preceding mode is the own vehicle driving history mode, the processor 110 may process own vehicle driving history data received from a driving history storage unit 140 and display a recommendation driving history list on the display unit 160. For example, the recommendation driving history list may be classified by time periods and days of the week. The own vehicle driving history data may include at least one of a driving date, a time required, a mileage, and the like, which correspond to the route information, but is not limited thereto.

The processor 110 may control the virtual preceding vehicle 2000 corresponding to the own vehicle driving history data selected by the driver.

According to an embodiment, when the virtual preceding mode is the own vehicle driving history mode, the processor 110 may analyze the other vehicle driving history data received from the server 310 and stored in the driving history storage unit 140 and display a recommendation driving history list on the display unit 160. The other vehicle driving history data may include at least one of a user name, a time required, a mileage, and the like, which correspond to the route information, but is not limited thereto.

Figure 21:
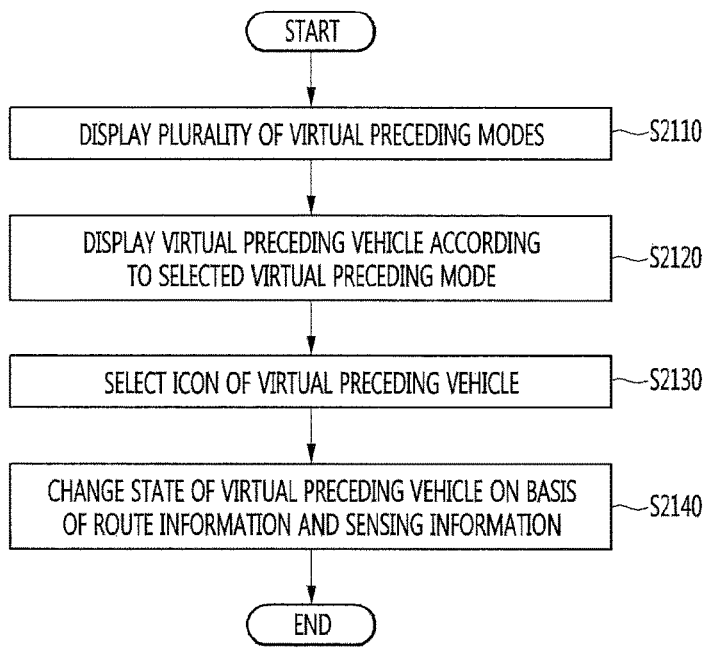
FIG. 21 is a flowchart for explaining an operation for selecting an icon of the virtual preceding vehicle according to an embodiment of the present invention.
Figure 22:
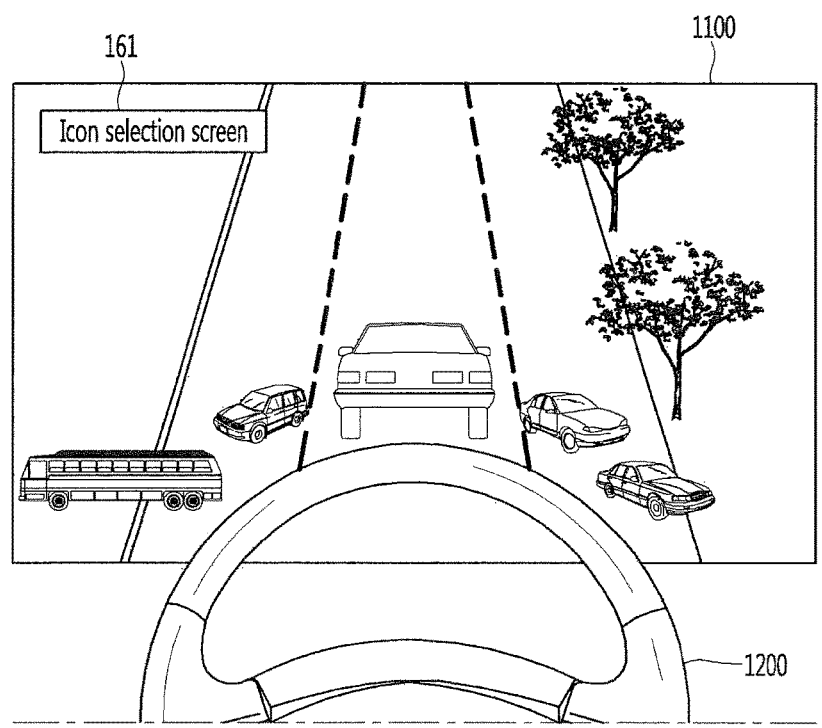
FIG. 22 is a front view of the display unit for selecting the icon of the virtual preceding vehicle according to an embodiment of the present invention.

FIG. 21 is a flowchart for explaining an operation for selecting an icon of the virtual preceding vehicle according to an embodiment of the present invention, and FIG. 22 is a front view of the display unit for selecting the icon of the virtual preceding vehicle according to an embodiment of the present invention.

Referring to FIGS. 21 and 22, a processor 110 may display a plurality of virtual preceding modes on a display unit 160 (S2110). The plurality of virtual preceding modes may include a destination mode, a minimum distance preference mode, a minimum fuel consumption preference mode, a safety mode, and a past driving history mode, but is not limited thereto.

The user input unit 130 may receive one of the virtual preceding modes by the driver. Here, the user input unit 130 may perform an input through a voice input of the driver, a manipulation of a steering input unit 120, and a touch manipulation, but is not limited thereto.

The processor 110 may display a virtual preceding vehicle 2000 corresponding to the virtual preceding mode selected by the driver on the display unit 160 (S2120). Thereafter, the processor 110 may display a plurality of virtual preceding vehicle icons (S2130). For example, the icons may be kinds of various vehicles. When the driving of the vehicle 1000 is started, the processor 110 may change a state of the virtual preceding vehicle 2000 on the basis of the route information and sensing information received from the interface unit 190 (S2130).

According to an embodiment, the processor 110 may detect a color and transparency of the virtual preceding vehicle 2000 in real time on the basis of the sensing information including illumination and brightness information of the display unit 160 and change the color and transparency of the virtual preceding vehicle 2000 on the basis of the detected color and transparency to improve discrimination of the driver with respect to the virtual preceding vehicle 2000.

Figure 23:
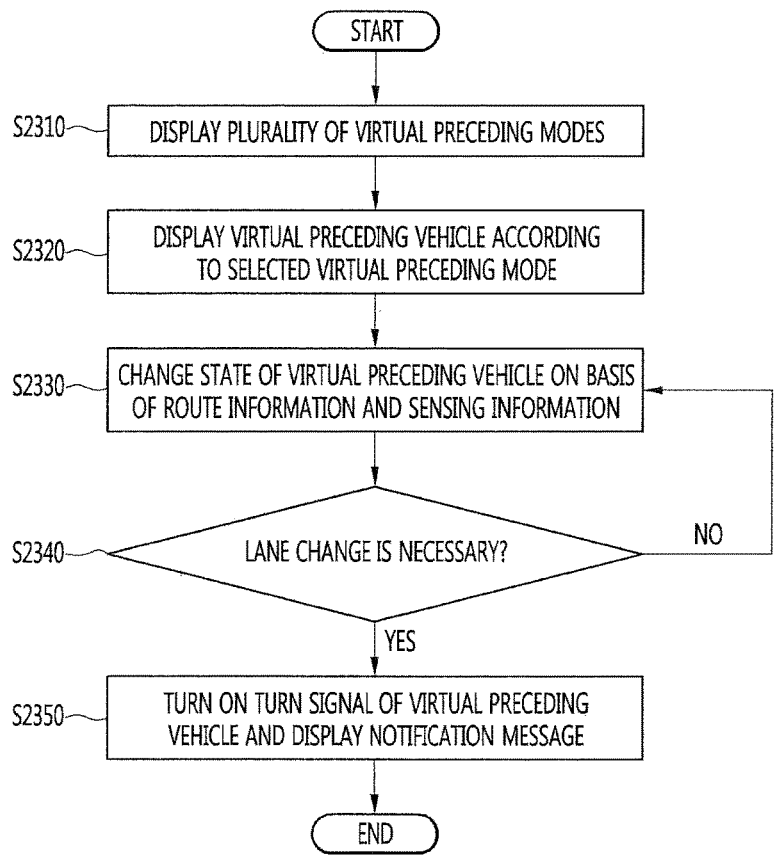
FIG. 23 is a flowchart for explaining an operation for a lane change of the virtual preceding vehicle according to an embodiment of the present invention.

FIG. 23 is a flowchart for explaining an operation for the lane change of the virtual preceding vehicle according to an embodiment of the present invention.

Referring to FIG. 23, the processor 110 may display the plurality of virtual preceding modes on the display unit 160 (S2310). The plurality of virtual preceding modes may include a destination mode, a minimum distance preference mode, a minimum fuel consumption preference mode, a safety mode, and a past driving history mode, but is not limited thereto.

The processor 110 may display a virtual preceding vehicle 2000 corresponding to the virtual preceding mode selected by the driver on the display unit 160 (S2320).

When the driving of the vehicle 1000 is started, the processor 110 may change a state of the virtual preceding vehicle 2000 on the basis of the route information and sensing information received from the interface unit 190 (S2330). For example, when it is determined that the lane change is necessary (S2340), the processor 110 may interpret the sensing information and the traffic condition information to turn on the turn signal 200 or 2200 of the vertical preceding vehicle 2000 and display a notification message on a notification window (S2350). That is, the driver may safely change the lane according to the guidance of the virtual preceding vehicle 2000.

According to an embodiment, when the vehicle 1000 enters into a specific section during the driving, the processor 110 may display the display or not of the virtual preceding vehicle 2000 on the display unit 160 (S2340). The specific section may be a section that is preset by the user. Data with respect to the specific section may be received from the mobile terminal 310 or the server 320.

The above-described present invention may be implemented as a computer-readable code on a computer-readable medium in which a program is stored. The computer readable recording medium includes all types of recording devices in which data readable by a computer system is stored. Examples of the computer-readable recording medium include hard disk drives (HDD), solid state disks (SSD), silicon disk drives (SDD), read only memories (ROMs), random access memories (RAMs), compact disc read only memories (CD-ROMs), magnetic tapes, floppy discs, and optical data storage devices, and may be implemented in the form of a carrier wave transmitted over the Internet. Also, the computer may include the processor 110 or the control unit 200. Thus, the detailed description is intended to be illustrative, but not limiting in all aspects. It is intended that the scope of the present invention should be determined by the rational interpretation of the claims as set forth, and the modifications and variations of the present invention come within the scope of the appended claims and their equivalents.

The invention claimed is:

1. An assistance apparatus for driving of a vehicle, the assistance apparatus being configured to be located in the vehicle, and to display an image representing a virtual vehicle generated by the assistance apparatus to assist the driving of a driver, the assistance apparatus comprising:
   a display unit that is configured to display the image on a windshield of the vehicle;
   an interface unit that is configured to receive route information including destination information that is set by the driver and sensing information detected by a sensing unit of the vehicle; and
   a processor that is configured to control a display state of the image based on at least one of the route information and the sensing information,
   wherein the processor is further configured to:
   detect at least one of safety distance information with respect to an outer vehicle located outside of the vehicle and speed limit information based on the sensing information received from the interface unit, and control the display state of the image according to the detected information,
   detect a distance between the outer vehicle and the vehicle through the sensing information, and change at least one of a size or a color of the image based on the detected distance being less than a critical value, and
   change at least one of a size or a color of the image based on the driving speed of the vehicle being greater than a speed limit; and,
   wherein the sensing information further comprises illumination and brightness information of the display unit, and
   the processor detects a color and transparency of the image in real time on the basis of the illumination and brightness information of the display unit and displays the image on the basis of the detected color and transparency.

2. The assistance apparatus according to claim 1, wherein the display unit is configured to display the image corresponding to a mode that is selected by a user among a plurality of modes that each assist the driver according to different manners, wherein the plurality of modes comprises at least one of a destination mode, a minimum distance preference mode, a minimum fuel consumption preference mode, a past driving history mode, and a safety mode.

3. The assistance apparatus according to claim 2, wherein, when the selected mode is one of the destination mode, the minimum distance preference mode, and the minimum fuel consumption preference mode, the processor is configured to control the display state of the image to assist a route of the vehicle on the basis of the route information received from the interface unit.

4. The assistance apparatus according to claim 3, wherein the route information comprises destination information, minimum distance preference information, and minimum fuel consumption preference information, which are set by the user.

5. The assistance apparatus according to claim 2, further comprising a driving history storage unit storing past driving history data of the vehicle and past driving history data of other vehicle, wherein, when the past driving history mode is a first vehicle past driving history mode, the processor is further configured to the display state of the image based on the past driving history data of the vehicle received from the driving history storage unit.

6. The assistance apparatus according to claim 5, wherein, when the past driving history mode is a second vehicle past driving history mode, the processor is further configured to display the display state of the image based on the past driving history data of the other vehicle received from the driving history storage unit.

7. The assistance apparatus according to claim 6, wherein the display unit displays the past driving history data of the other vehicle corresponding to the route information received from the interface unit.

8. The assistance apparatus according to claim 1, wherein the processor detects road condition information on the basis of the sensing information received from the interface unit and controls the display state of the image according to the road condition information.

9. The assistance apparatus according to claim 1, wherein the interface unit receives traffic condition information from a communication unit, the processor controls the display state of the image on the basis of the traffic condition information received from the interface unit, and the traffic condition information comprises at least one of traffic volume information, traffic accident information, emergency situation information, and weather information.

10. The assistance apparatus according to claim 1, further comprising a user input unit, wherein, when a lane change signal is received from the user input unit, the processor controls the display state of the image on the basis of the sensing information received from the interface unit and the lane change signal.

11. The assistance apparatus according to claim 10, wherein, when the lane change signal is received from the user input unit, the processor changes the display state of the image to turn on a turn signal and to change a lane in a direction corresponding to the lane change signal.

12. The assistance apparatus according to claim 1, wherein, when the safety distance information and the speed limit information exceed a critical value, the processor changes a shape of the image.

13. The assistance apparatus according to claim 9, wherein, when an emergency situation is detected on the basis of the traffic condition information, the processor changes a shape of the image.

14. The assistance apparatus according to claim 13, wherein, when the emergency situation is detected on the basis of the traffic condition information, the processor changes the display state of the image to turn on an emergency lamp and displays an alarm message on the display unit.

15. A vehicle comprising the assistance apparatus according to claim 1.

* * * * *